(No Model.)
H. F. CAMPBELL.
JACK FOR RAISING CARS.
No. 416,990. Patented Dec. 10, 1889.
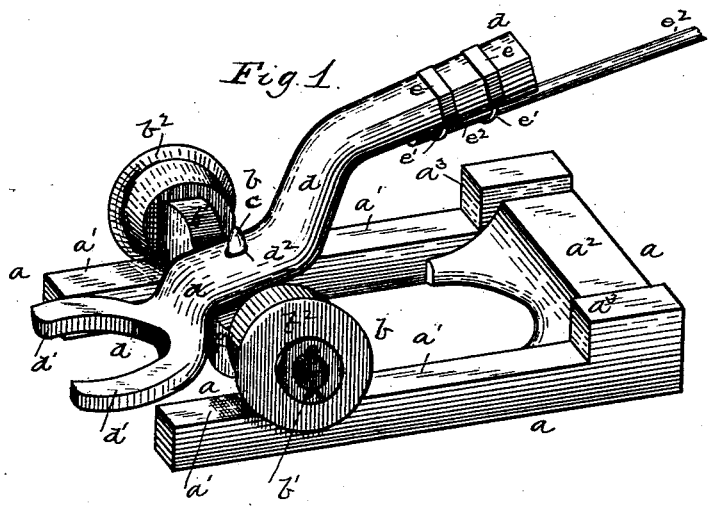
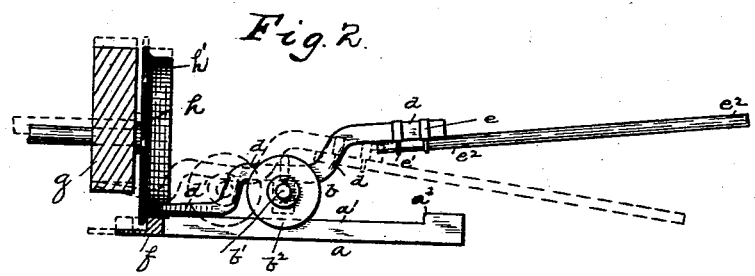
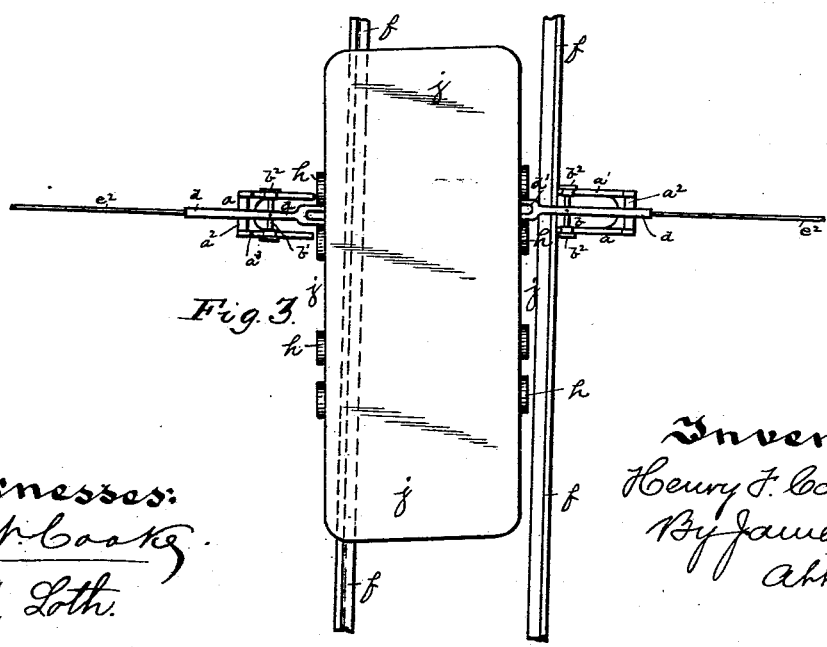
Witnesses:
J. N. Cooke.
A. Loth.
Inventor:
Henry F. Campbell
By James F. Ray
Attorney

UNITED STATES PATENT OFFICE.

HENRY F. CAMPBELL, OF PITTSBURG, PENNSYLVANIA, ASSIGNOR OF ONE-HALF TO JULIUS C. KESSMIER, OF SAME PLACE.

JACK FOR RAISING CARS.

SPECIFICATION forming part of Letters Patent No. 416,990, dated December 10, 1889.

Application filed June 19, 1889. Serial No. 314,833. (No model.)

*To all whom it may concern:*

Be it known that I, HENRY F. CAMPBELL, a resident of Pittsburg, in the county of Allegheny and State of Pennsylvania, have invented a new and useful Improvement in Jacks for Raising Cars; and I do hereby declare the following to be a full, clear, and exact description thereof.

My invention relates to jacks for raising cars, its object being not only to provide a strong and durable jack for raising the car, but also to provide a means of transporting said car a short distance when thus raised by the jack in order to place it on the track.

My invention is especially applicable to be used in connection with the operation of cable and electric railways, where the cars employed are large and very heavy, and if once they leave the track it is a matter of much difficulty and labor to restore them in position again upon the track. Cars of this style are generally made larger than the ordinary horse-cars and are mounted on two trucks of four wheels each, so that it is possible for the wheels of the front truck to leave the track while the wheels of the rear truck remain in position on the rails. With the car in this position it is impossible by means of the grip or the motive power employed to draw the displaced truck back to the rails, as there is no way of guiding the car to bring the wheels of the truck upon the rails, and consequently the car must be lifted or shoved by some means onto the track, which is not only a difficult and tedious operation, but necessitates a very rough handling of the car. By my invention these difficuties are practically overcome.

It consists, generally stated, in a jack having a portable track, a truck adapted to move thereon, and a lever pivoted on said truck and adapted to engage with the car and raise the same and carry it onto the track by means of the truck on the portable track.

To enable others skilled in the art to make and use my invention, I will describe the same more fully, referring to the accompanying drawings, in which—

Figure 1 is a perspective view of my improved jack ready for operation. Fig. 2 is a side view of the jack, showing the lever engaging with one of the wheels of the car-truck; and Fig. 3 is a plan view of a car with a jack on each side and the lever engaging with the cross-beams of the car-truck which connects the two axles.

Like letters of reference indicate like parts in each.

The portable track $a$ may be of any suitable size convenient for handling, and may be constructed of iron, steel, or other suitable material. It consists of the rails $a'$, connected at one end by the cross-piece $a^2$, by which the said rails are braced and held in alignment with each other, and said rails are constructed with the shoulders $a^3$ near the end thereof, which act as bumpers for the wheels of the truck $b$ and prevent said wheels from running off the rails $a'$ at that end of the track. The truck $b$ is adapted to run on the portable track $a$, and is composed of the axle $b'$ and the wheels $b^2$, suitably journaled and secured thereon. From the center of the axle $b'$ the pivotal pin $c$ arises, secured to the axle $b'$, and by means of said pin the lever $d$ is pivoted to the axle $b'$. This lever $d$ may be formed of wrought-iron, steel, or other suitable material, and is preferably constructed with the bifurcated end $d'$, although any other convenient form may be employed. The lever $d$ is formed of such a shape that the portion thereof having the opening $d^2$ therein may rest with a flat surface on the axle $b'$ when the pin $c$ passes up through the said opening $d^2$, and is adapted to swing from side to side on its pivofal pin and be raised and lowered on the truck as a fulcrum, so that by means of it the car or car-truck lifted thereby can be moved in the desired direction. The lever $d$ is further supplied with the straps or bands $e$ near its upper end, which have the loops or seats $e'$ depending therefrom, in which a long arm or crow-bar $e^2$, of suitable material, may be inserted in order to furnish the proper amount of leverage in raising the car.

Since in the employment of my improved jack the lever may be adjusted either to engage directly with the wheels of the truck of the car or with the cross-beams thereof, I will first describe its operation as engaging with the wheels, as shown in Fig. 2, in which $f$ are the rails of the car-track, $g$ a portion of the truck which supports the car, and $h$ the wheels of said truck. If the front truck of the car has left the track, the portable tracks $a$ are arranged one on each side of the truck in such a position that when the car has been raised it may be transferred the required distance upon the trucks $b$, moving on the rails $a$ until the wheels $h$ of the car are directly above the rails $f$ and may be lowered thereon. This position of the portable tracks $a$ with reference to the car is clearly illustrated in Fig. 3, in which the portable track on the right is placed at some distance from the car $j$, and the one on the left is placed as close to the said car as possible, so that when the car is raised and force is applied to transfer it to the rails $f$ the truck on the portable track on the left will travel toward the open end of the portable track, while the truck on the right will travel toward the shoulders $a^3$ on said track, so that all danger of their running off the rails at that end is avoided. When the portable tracks have been thus placed in position and the several parts of the jacks arranged as shown in Fig. 1, the levers $d$ are adjusted so that their bifurcated ends $d'$ will engage with the treads $h'$ of the wheels $h$, one arm of said bifurcated end on each side of the wheel. As the opening between said arms of the bifurcated end $d'$ is smaller than the diameter of the wheel $h$, when power is applied to draw down the long arm $e^2$ to raise the car the said bifurcated ends will be wedged against the tread $h'$ on both sides of the wheels, so that said wheels, together with the car supported thereon, will be raised. When the car has been raised to this position, it is a matter of little difficulty to force the car either to the right or left, as may be desired, for the trucks $b$ travel readily on the rails $a'$.

By allowing the long arm $e^2$ to ascend slowly the car may be gradually lowered onto the rails without jarring the same. Fig. 3 shows the other method of adjusting the lever $d$, in which the arms $d'$ of said lever engage with the cross-beams $i$ of the car-truck between the wheels; but, as there is no change in the operation of the apparatus from what has been described, no further description is necessary.

As the several parts comprising my improved jack are constructed of a size convenient for handling, they may be easily stored away under the seats of the car or other out-of-the-way place, so that each car may be supplied with one.

What I claim as my invention, and desire to secure by Letters Patent, is—

1. In jacks for raising cars, the combination of a portable track, a truck running thereon, and a lever pivoted on said truck and adapted to engage with the cars and raise the same and transfer it when raised onto the track by means of the truck on the portable track, substantially as and for the purposes set forth.

2. In jacks for raising cars, the combination of the portable track $a$, truck $b$, and the lever $d$, pivoted thereto, having the bifurcated end $d'$, substantially as and for the purposes set forth.

3. In jacks for raising cars, the combination of the portable track $a$, truck $b$, the lever $d$, pivoted thereto and having the seats $e'$, and the crow-bar $e^2$, substantially as and for the purposes set forth.

In testimony whereof I, the said HENRY F. CAMPBELL, have hereunto set my hand.

HENRY F. CAMPBELL.

Witnesses:
J. N. COOKE,
F. G. KAY.